United States Patent
Leis et al.

(10) Patent No.: US 7,647,468 B2
(45) Date of Patent: Jan. 12, 2010

(54) COMPACTION, DE-FRAGMENTATION, AND MERGING OF VIRTUAL STORAGE DEVICE OF VIRTUAL MACHINE

(75) Inventors: Benjamin A. Leis, Seattle, WA (US); Parag Chakraborty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 292 days.

(21) Appl. No.: 11/408,564

(22) Filed: Apr. 21, 2006

(65) Prior Publication Data
US 2007/0136551 A1 Jun. 14, 2007

Related U.S. Application Data

(60) Provisional application No. 60/748,906, filed on Dec. 9, 2005.

(51) Int. Cl.
*G06F 13/00* (2006.01)
*G06F 13/28* (2006.01)
*G06F 12/00* (2006.01)

(52) U.S. Cl. ........ 711/173; 711/203; 707/205; 718/104

(58) Field of Classification Search ......... 711/173; 707/206
See application file for complete search history.

(56) References Cited

U.S. PATENT DOCUMENTS

| 2003/0229645 A1* | 12/2003 | Mogi et al. ......... 707/102 |
| 2006/0107017 A1* | 5/2006 | Serizawa et al. ...... 711/170 |
| 2007/0028244 A1* | 2/2007 | Landis et al. ......... 718/108 |

* cited by examiner

*Primary Examiner*—Pierre-Michel Bataille
*Assistant Examiner*—Edward J Dudek
(74) *Attorney, Agent, or Firm*—Woodcock Washburn LLP (57) ABSTRACT

A computing device is partitioned to include a host partition (HP) instantiated at least in part to provide storage capabilities, and also to include a client partition (CP) instantiated at least in part to consume such storage capabilities of the HP in the form of a virtual storage device at the CP. The HP implements the virtual storage device of the CP as an image file on a physical storage device. The image file at the HP is compacted while the CP is active and employing the corresponding virtual storage device.

19 Claims, 8 Drawing Sheets

COMPACTION, DE-FRAGMENTATION, AND MERGING OF VIRTUAL STORAGE DEVICE OF VIRTUAL MACHINE

CROSS REFERENCE TO RELATED APPLICATION

This application claims the benefit of U.S. Provisional Application No. 60/748,906, filed Dec. 9, 2005, hereby incorporated by reference in its entirety.

TECHNICAL FIELD

The present invention relates to a method and mechanism for performing maintenance operations including compaction, de-fragmentation, and merging on a virtual storage device of a virtual machine. More particularly, the present invention relates to providing such a method and mechanism that can perform such maintenance operations on the virtual storage device as such virtual storage device is being employed by the virtual machine.

BACKGROUND OF THE INVENTION

As should be appreciated, a virtual machine is a software application operating on a computing device for the purpose of emulating a hardware system. Typically, although not necessarily, the virtual machine is employed on the computing device to host a user application or the like while at the same time isolating such user application from such computing device or from other applications on such computing device. It may be the case that a different variation of a virtual machine is written for each of a plurality of different computing devices so that any user application written for the virtual machine can be operated on any of the different computing devices. Thus, a different variation of the user application for each different computing device is not needed.

Among other things, a virtual machine may require access to a storage device to store and retrieve data, and generally for any purpose that a storage device would be employed. Accordingly, the virtual machine may in fact be provided with such a storage device. Notably, inasmuch as the virtual machine is in fact a software construct, so too may the provided storage device employed thereby be a part of the software construct that is the virtual machine or else another software construct. In either case, the storage device is in effect a virtual storage device.

New architectures for computing devices and new software now allow a single computing device to run a plurality of partitions, each of which can be employed to instantiate a virtual machine to in turn host an instance of an operating system. In such a computing device, a storage hardware device of the computing device such as a RAM memory or a hard disk drive memory may be dynamically assigned to a particular partition so that the particular partition can directly control such storage hardware device. Such particular partition, then, is in effect a host that provides storage capabilities as a 'storage host partition' ('SHP'). Similarly, such SHP provides storage services to another partition which is in effect a client that consumes such capabilities as a 'storage client partition' ('SCP'). Thus, the SCP and the SHP communicate to accomplish storage-related operations.

Typically, a virtual storage device of an SCP is provided by the SHP in the form of an actual storage image file maintained by the SHP in an actual storage hardware device. Thus, and as may be appreciated, changes made to the virtual storage device by the SCP are persisted by the SHP in the corresponding storage image file on the storage hardware device. Put another way, the actual storage image file is a representation of the virtual storage device of a virtual machine such as an SCP. Accordingly, whenever the virtual operating system of the SCP executes a read or write operation with regard to the virtual storage device thereof, the operation data is read from or written to the storage image file by the SHP.

Inasmuch as the virtual storage device of an SCP might be expected to have a relatively large storage capacity, perhaps on the order of 1-16 gigabytes or more, it follows that, absent other considerations, the corresponding storage image file as maintained by the SHP can also have the same relatively large storage capacity. However, and as should be appreciated, the storage capacity of the virtual storage device likely is not fully occupied by data, and instead may contain significant if not large amounts of empty space or space with null data therein. As should be appreciated, then, such null data in the virtual storage device need not be represented within the corresponding storage image file, at least on a byte-for-byte basis. By not storing null data from the virtual storage device in the corresponding storage image file, then, such storage image file may be stored on the storage hardware device as a smaller if not much smaller file.

Accordingly, a need exists for a method and mechanism by which the storage image file corresponding to a virtual storage device may be stored on a storage hardware device in a relatively compact form whereby null data from the virtual storage device is only minimally represented within the storage image file. In particular, a need exists for such a method and mechanism whereby maintenance may be performed on the storage image file, for example to compact same or to de-fragment same. In addition, a need exists for such a method and mechanism that can perform such maintenance while the virtual storage device is being employed by a virtual machine or the like, such that the virtual machine need not be halted to perform the maintenance.

SUMMARY OF THE INVENTION

A method is provided with regard to a computing device partitioned to include a host partition (HP) instantiated at least in part to provide storage capabilities, and also to include a client partition (CP) instantiated at least in part to consume such storage capabilities of the HP in the form of a virtual storage device at the CP. The HP implements the virtual storage device of the CP as an image file on a physical storage device. The method compacts the image file at the HP while the CP is employing the corresponding virtual storage device.

A command is received to compact the image file, and it is determined that the CP is active and that the image file is currently in use by the CP to implement the virtual storage device thereof. A block layout of the virtual storage device is obtained from the CP thereof, where the block layout represents all allocated data blocks at the virtual storage device that have stored data and correspondingly non-allocated data blocks at the virtual storage device that have null data. Likewise, a block allocation table (BAT) of the image file is retrieved, where the BAT represents the image file as stored as blocks at the physical storage device. At least some of the blocks referenced in the BAT have corresponding blocks referenced in the block layout from the CP, and at least some of the blocks referenced in the BAT do not have corresponding blocks referenced in such block layout. If a block is referenced in the BAT without a corresponding block in the block layout, such referenced block contains null data and may be deleted from the image file.

Thus, the block layout from the CP and the BAT from the image file is compared to identify each block referenced in the BAT that does not have a corresponding block in the block layout as an unnecessary block that may be deleted from the image file, and a modified block layout is created with each unnecessary block removed therefrom. The image is then compacted by identifying from the modified block layout each data block to be removed from the image file and removing such identified data block.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
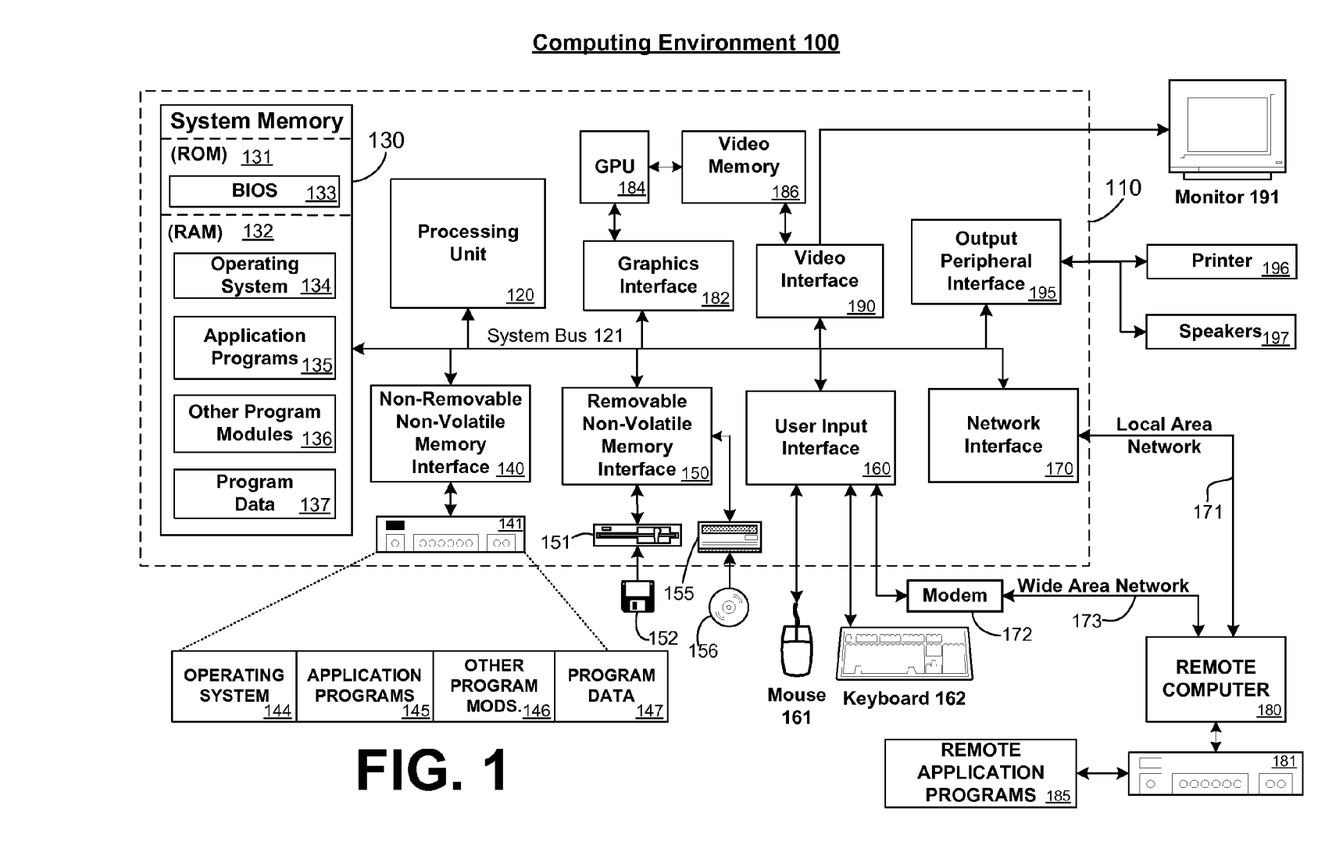
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection or fiber optic connection, and wireless media such as acoustic, RF, infrared, optical, phased-array antenna operating at any wavelength, directional and non-directional electromagnetic emitters and receivers operating at any wavelength, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
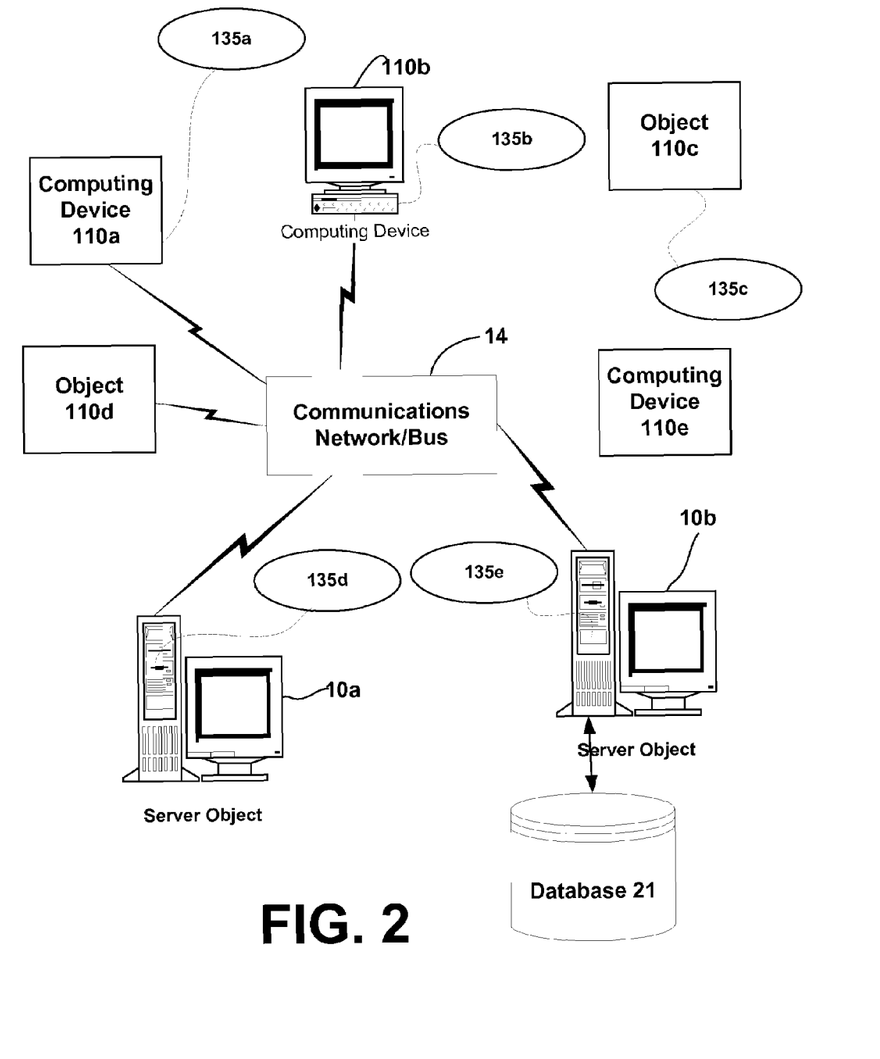
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire-line or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers processing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source, and to any computing device with which it is desirable to render high performance graphics generated by a virtual machine.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 21.

Partitioned Computing Device

Figure 3:
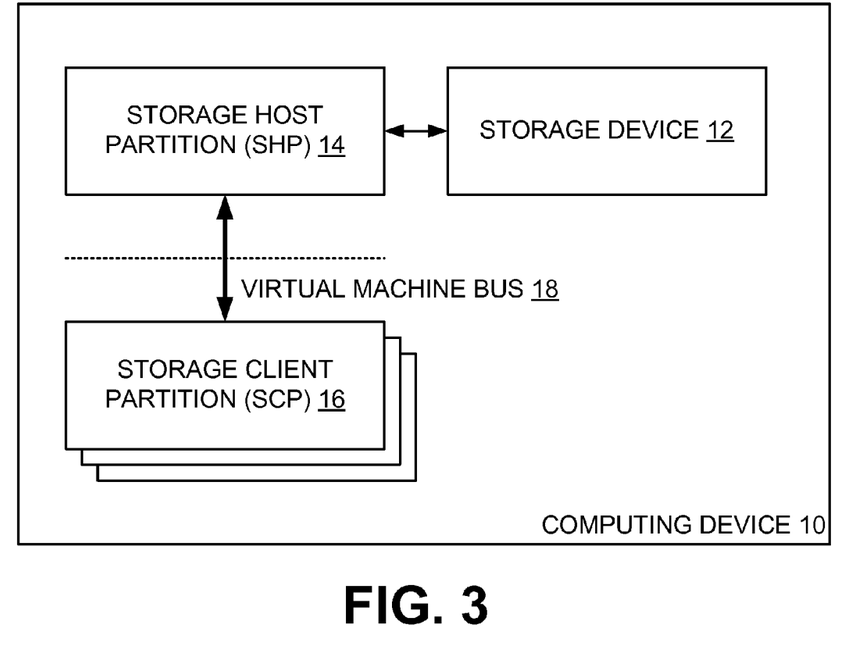
FIG. 3 is a block diagram showing a computing device running a plurality of partitions including a storage host partition (SHP) that owns a storage hardware device and provides storage services and a storage client partition (SCP) that employs the storage services of the SHP in accordance with embodiments of the present invention.

Turning now to FIG. 3, a computing device 10 includes a storage device 12 that is employed to store data on the computing device 10. Such computing device 10, storage device 12, and stored data may be any appropriate computing device, storage device, and stored data without departing from the spirit and scope of the present invention. For example, the computing device 10 may be a personal computer such as a desktop or laptop computer or the like with a hard disk drive as the storage device 12 and corresponding data thereon. Likewise, the computing device 10 maybe a portable playback machine such as a portable audio or video player with a RAM memory as the storage device 12 and corresponding data thereon.

Significantly, the computing device 10 has been configured to run a plurality of partitions, where each partition can be employed to instantiate a virtual machine to in turn host an instance of an operating system. As seen, in such computing device 10, the storage device 12 of the computing device 10 is assigned to a particular partition 14 so that the particular partition 14 can directly control such storage device 12. Such particular partition 14, then, is a host that provides storage capabilities as a 'storage host partition' ('SHP 14'). Similarly, such SHP 14 provides storage services to one or more other partitions 16, each of which is in effect a client that consumes such capabilities as a 'storage client partition' ('SCP 16'). Thus, each SCP 16 and the SHP 14 communicate by way of a virtual machine bus 18 or the like to accomplish storage-related operations, as will be set forth in more detail below.

Figure 4:
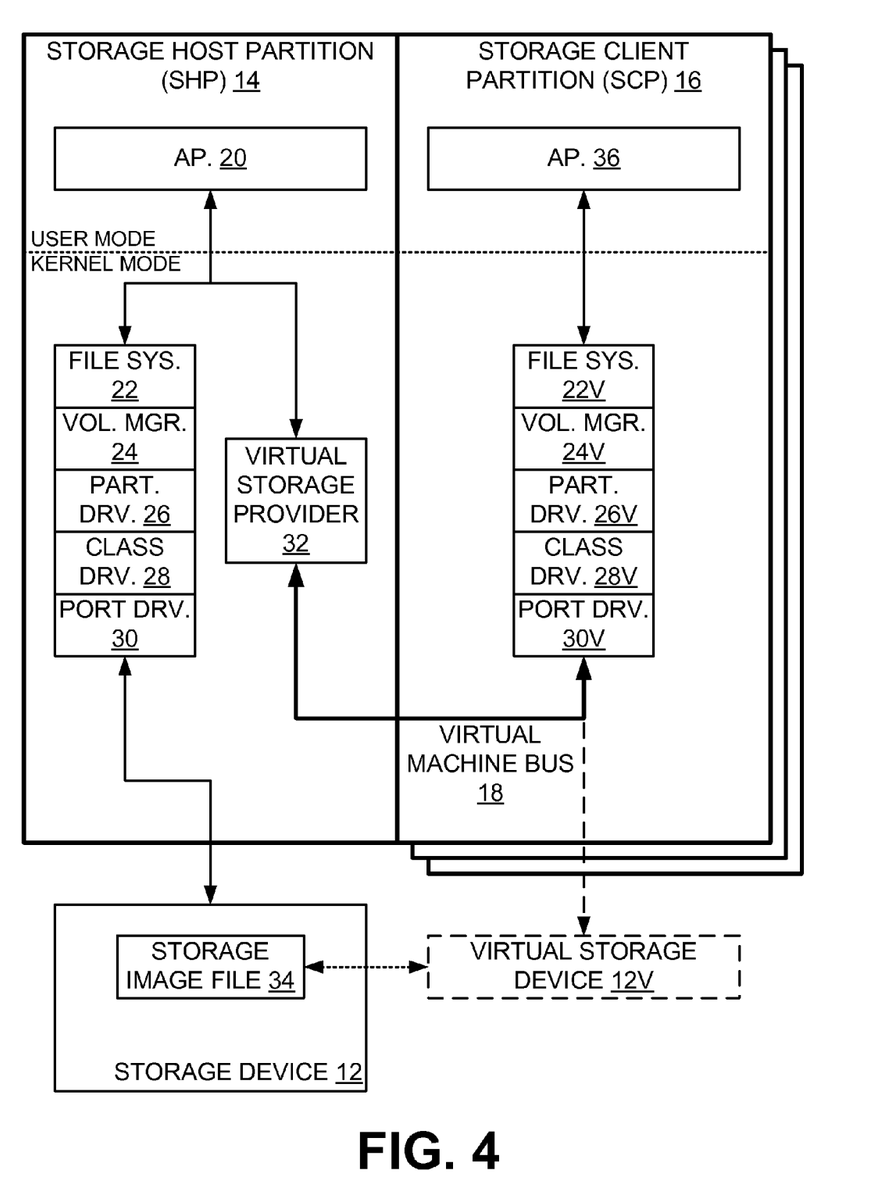
FIG. 4 is a block diagram showing the SHP and SCP of FIG. 3 in additional detail in accordance with embodiments of the present invention.

Turning now to FIG. 4, it is seen that the SHP 14 and each SCP 16 include the following elements relating to initiating and performing storage operations. FIG. 4 presumes that the computing device 10 of FIG. 3 and each partition 14, 16 thereof are functionally operated to include both a user mode and a kernel mode, although such modes are not perceived to be absolutely necessary for purposes of the present invention. At any rate, and as may be appreciated, the user mode is a generally non-privileged state where executing code is forbidden by the hardware from performing certain operations, such as for example writing to memory not assigned to such code. Generally such forbidden operations are those which could destabilize the operating system of the partition 14, 16 or constitute a security risk. In terms of the operating system, the user mode is an analogous non-privileged execution mode where the running code is forbidden by the kernel from performing potentially dangerous operations such as writing to system configuration files, killing other processes, rebooting the system, and the like.

As may also be appreciated, the kernel mode or privileged mode is the mode in which the operating system and related core components run. Code running in the kernel mode has unlimited access to the system memory and external devices that are assigned to the partitions 14, 16. Generally, the amount of code running in kernel mode is minimized, both for purposes of security and elegance. Roughly speaking, a user of a computing device 10 interfaces therewith most directly through the user mode and applications operating therein, while the computing device 10 interfaces with external devices, including the storage device 12, most directly through the kernel mode.

With the user and kernel modes as set forth above, then, and still referring to FIG. 4, it is seen that in one embodiment of the present invention the SHP 14 has in the user mode portion thereof a maintenance application 20 for maintaining the storage device 12 and files stored therein. Thus, the maintenance application 20 may for example be executed to check the storage device 12 for errors, clean up files on the storage device 12, compact files on the storage device 12, de-fragment files on the storage device 12, and the like.

In addition, the SHP 14 has in the kernel mode portion thereof a storage stack for accessing the storage device 12 and performing storage operations with regard to the storage device 12 and perhaps other storage devices. As may be appreciated, such storage operations include reading data from the storage device 12, writing data to the storage device 12, deleting data from the storage device 12, moving data within the storage device 12, erasing data from the storage device 12, and the like. As seen, the stack may include a file system 22, a volume manager 24, a partition driver 26, a class driver 28, and a port driver 30 that interfaces with the storage device 12 by way of a direct connection, a network connection, or the like. Such items are known or should be apparent to the relevant public and therefore need not be set forth herein in any detail.

Also, the SHP 14 has in the kernel mode portion thereof a virtualization storage provider 32 or the like for implementing access to the storage device 12 for each SCP 16. As will be set forth below, each SCP 16 has a virtual storage device 12v which in reality is an image file 34 on the storage device 12 of the SHP 14, and the virtualization storage provider 32 thus implements each storage operation by the SCP 16 to the virtual storage device 12v thereof by in fact performing the storage operation on the image file 34 at the storage device 12. Accordingly, the provider 32 may access the file system 22 in the course of reading data to and writing data from the image file 34. Note here that the virtual storage device 12v is implemented at the SCP 16 as a kernel mode driver that communicates with the virtual storage provider 32 by way of the bus 18. However, as shown in FIG. 4, such virtual storage device 12v is conceptually external to the SCP 16 in a manner similar to the storage device 12 being external to the SHP 14. Accordingly, such virtual storage device 12v and the communicative couplings thereof as conceptually represented are shown with dashed lines in such FIG. 4.

Still referring to FIG. 4, it is seen that for each SCP 16 hosted by the SHP 14, such SCP 16 likely includes in the user mode portion thereof one or more applications 36 that require storage services from the SCP 16. Such applications 36 may of course be any applications without departing from the spirit and scope of the present invention. However, and again, inasmuch as the SCP 16 is a virtual machine, such storage services are in fact performed by the SHP 14 and the provider 32 thereof on behalf of the SCP 16, where the provider 32 is in communication with such SCP 16 by way of the virtual machine bus 18.

As may be appreciated, to implement storage services at the SCP 16 as a virtual machine, the kernel mode portion of such SCP 16 may have an arrangement similar to that of the SHP 14, with a storage stack that may include a file system 22v, a volume manager 24v, a partition driver 26v, a class driver 28v, and a port driver 30v. Here, though, the port driver 30v interfaces with the virtual machine bus 18 and not a physical storage device 12, although to the SCP 16 it appears that the port driver 30v instead is communicating with a virtual storage device 12v. As may be appreciated, the port driver 30v by way of the bus 18 in fact communicates with the provider 32 at the SHP 14 to implement storage operations, whereby storage commands received from the port driver 30v of the SCP 16 by the virtual storage provider of the SHP 14 are forwarded to the image file 34 at the storage device 12 by way of the file system 22 and the remainder of the storage stack of the SHP 14. As a result, the image file 34 is a representation of the virtual storage device 12v of the SCP 16.

Compacting Image File 34

As was noted above, the virtual storage device 12v of the SCP 16 might be expected to have a relatively large storage capacity, perhaps on the order of 1-16 gigabytes or more. Thus, it follows that, absent other considerations, the corresponding storage image file 34 as maintained by the SHP can also have the same relatively large storage capacity. However, and as should be appreciated, the storage capacity of the virtual storage device 12v likely is not fully occupied by data, and instead may contain significant if not large amounts of empty space or space with null data therein. As should be appreciated, then, such null data in the virtual storage device 12v need not be represented within the corresponding storage image file 34, at least on a byte-for-byte basis. By doing so, such storage image file 34 may be stored on the storage device 12 as a smaller if not much smaller file and in an at least partially compacted form.

In the situation where the image file 34 is stored on the storage device 12 as an at least partially compacted file, and as may be appreciate, such image file 34 is expanded as necessary when the SCP 16 writes additional data to the corresponding virtual storage device 12v. Typically, such expansion occurs in increments of fixed size, such as for example 1 or 2 megabytes or so, and is managed by the file system 22 and/or the provider 32 of the SHP 14 in a manner that should be known or apparent to the relevant public. Thus, the image file 34 is expanded upon growing beyond a certain size and thus the virtual storage device 12v at the SCP 15 may continue to be employed.

Note, though, that in the case where the image file 34 is expanded the fixed size of about 1 to 2 megabytes or so to accommodate additional data of a much smaller size, the vast majority of the expansion is unnecessary, and in fact can be detrimental in the situation where space at the storage device 12 is relatively valuable, such as for example where the storage medium 12 does not have much space left. In a similar manner, it may be that space within the image file 34 is freed when corresponding data has been deleted from the virtual storage device 12v, and such freed space should likewise be removed from the image file 34 to free space on the storage device 12. It is known in the prior art to provide a mechanism such as a utility application or the like to compact the image file 34. However, such mechanism has several limitations, the most important of which is that the compaction can only be performed on the image file 34 by the mechanism while the corresponding SCP 16 is not running. In addition, the compaction as performed by the mechanism is performed by the mechanism based on zeroed data and not on data that is null, with the result being that significant portions of non-zeroed but null data are not removed from the image file 34 during compaction, or else the time taken to zero null data can become significant. Also, the mechanism does not take into account that the data within the image file 34 may during compaction or during expansion be rearranged to reduce or remove de-fragmentation.

Accordingly, in one embodiment of the present invention, a method and mechanism is provided to perform compaction on the image file 34 while the corresponding SCP 16 is running. In such embodiment, the compaction is performed based on a bitmap representing all null data within the corresponding virtual storage device 12v, and the data within the image file 34 is rearranged to reduce or remove de-fragmentation.

Figure 5:
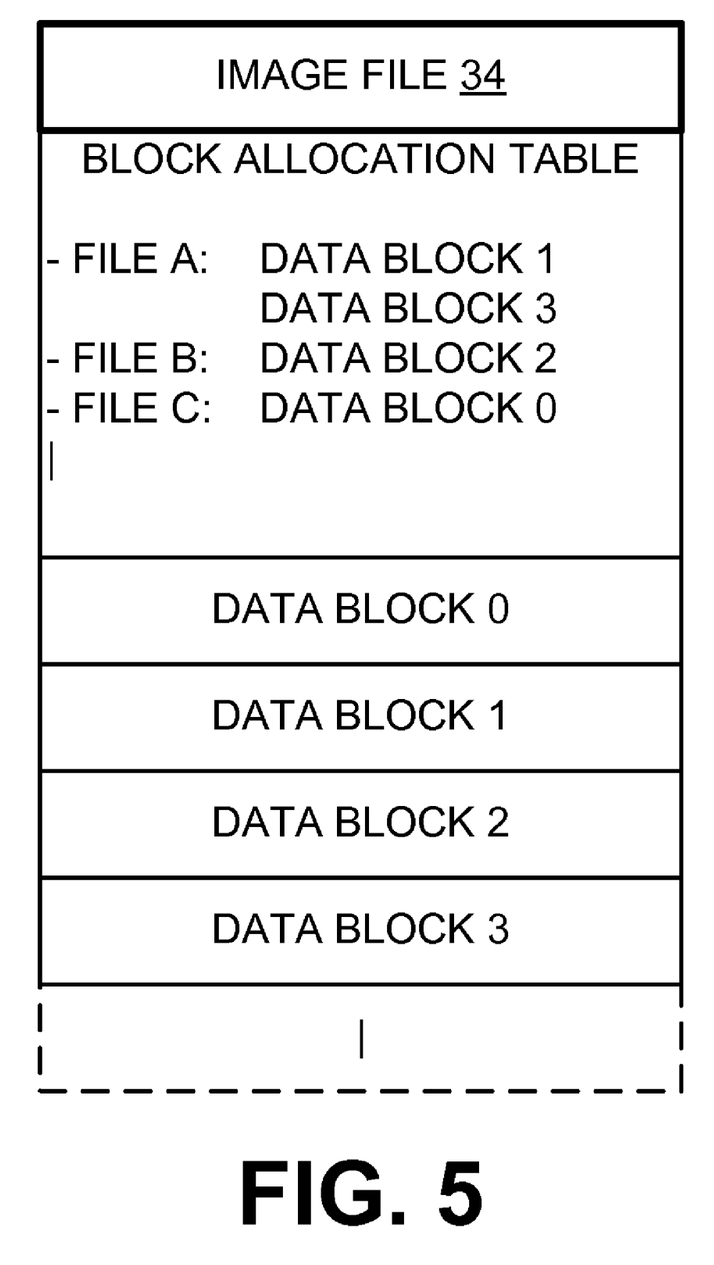
FIG. 5 is a block diagram showing an image file such as may represent a virtual storage device of the SCP of FIGS. 3 and 4 and as stored on an actual storage device such as that owned by the SHP of FIGS. 3 and 4.

Turning now to FIG. 5, it is seen that in one embodiment of the present invention, the image file 34 corresponding to the virtual storage device 12v of the SCP 16 is stored at the storage device 12 in the form of a series of data blocks along with a block allocation table (BAT) that holds for each virtual file in the image file 34 one or more physical offsets to data blocks containing the data for such virtual file. Such a BAT and the structure thereof is known or should be apparent to the relevant public and therefore may be any appropriate BAT and structure without departing from the spirit and scope of the present invention.

Thus, upon an application 36 at the SCP 16 requesting a particular virtual file or data therein from the virtual storage device 12v, for example, such request is forwarded to the provider 32 of the SHP 14. As may be appreciated, then, the provider 32 locates the data blocks for the virtual file within the corresponding image file 34 by way of the BAT. Thereafter, the provider 32 can access the virtual file or data therein by way of the located data blocks in a manner that is known or should be apparent to the relevant public.

Note that in the course of operating the virtual storage device 12v, the corresponding image file 34 may grow to include unnecessary data. As may be appreciated, such unnecessary data may include expanded space that is not occupied by substantive data, and may also include space that is occupied by null data. Typically, although not necessarily, such null data arises when data at the virtual storage device 12v is deleted. As may be appreciated, such 'deleted' data is not in fact removed from the virtual storage device 12v but instead space for such data is de-allocated, with the result being that the 'deleted' data remains and occupies space at the virtual storage device 12v and at the corresponding image file 34, but can be over-written by other data. Thus, the 'deleted' data both at the virtual storage device 12v and at the corresponding image file 34 is null data that can be removed at the image file 34 to free or open space occupied thereby.

Figure 6:
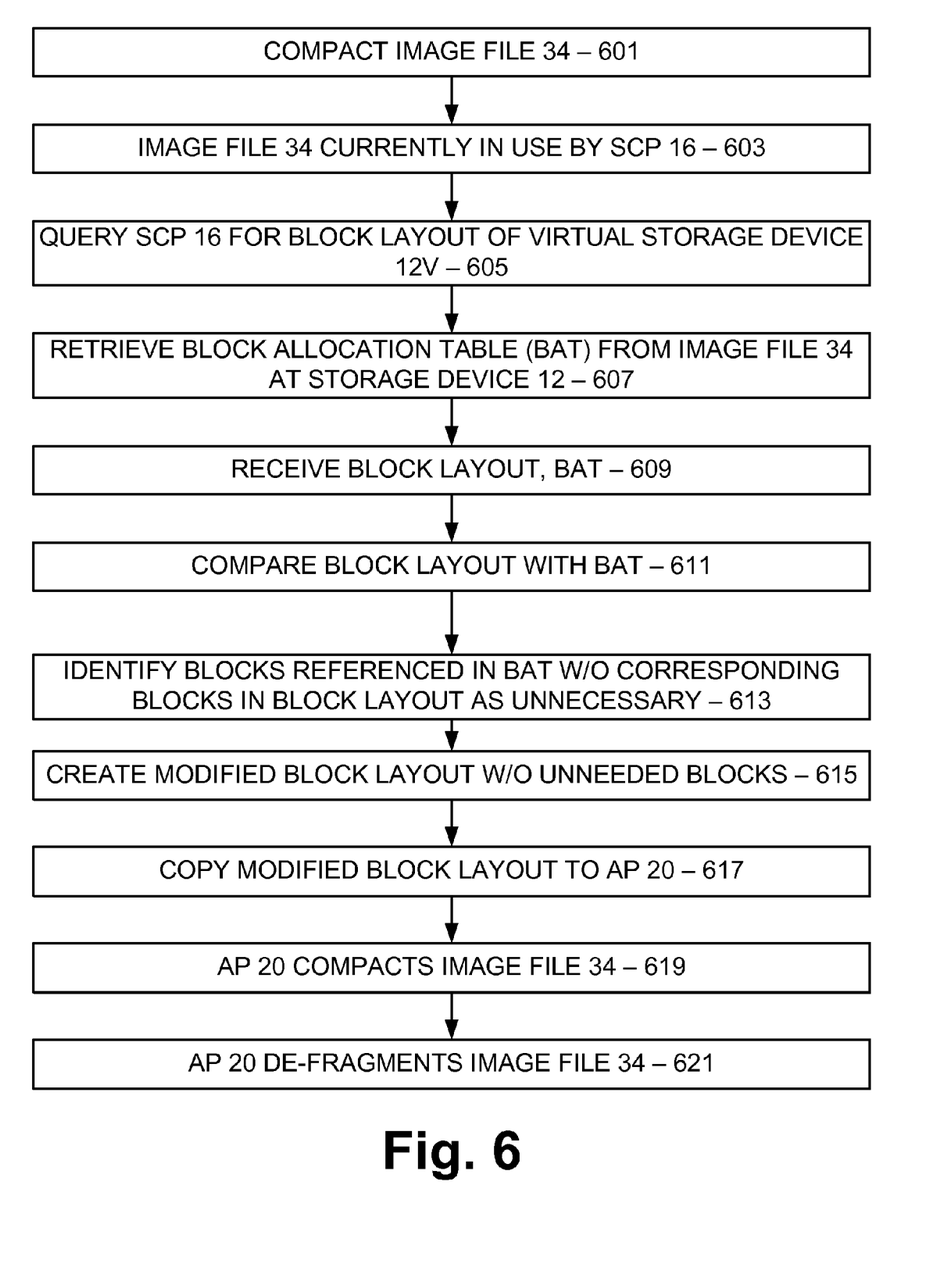
FIG. 6 is a is a flow diagram showing key steps performed by the SHP of FIGS. 3 and 4 when compacting and defragmenting the image file of FIG. 5 in accordance with one embodiment of the present invention.

In one embodiment of the present invention, and turning now to FIG. 6, the image file 34 at the SHP 14 is compacted by a maintenance application 20 or the like at the SHP 14 while the corresponding SCP 16 is running and according to the following compaction process. Preliminarily, the application 20 or the like sends a command to the virtualization storage provider 32 to compact the image file 34 (step 601), and the provider 32 determines that the image file 34 is currently in use by the corresponding SCP 16 to implement the virtual storage device 12v thereof (step 603).

Thus, the provider 32 sends a command to the SCP 16 to query for a block layout of the virtual storage device 12v (step 605), and awaits same. As may be appreciated, the block layout is essentially a bitmap or diagram or the like, and represents all allocated data blocks at the virtual storage device 12v that have stored data. Correspondingly, the block layout of the virtual storage device 12v from the SCP 16 does not refer to data at the virtual storage device 12v that is zeroed out and thus represents empty space, or data at the virtual storage device 12v that is null data. Such a layout of blocks of allocated data is known or should be apparent to the relevant public, and therefore may be created by the SCP 16 in any appropriate manner without departing from the spirit and scope of the present invention. Note here that a block within the block layout refers to a block within the image file 34 and not within the storage device 12. Also, a block as employed within the block layout may be any appropriate size of data and need not necessarily be the size of a disk block or a disk sector without departing from the spirit and scope of the present invention.

In addition, the provider 32 retrieves the block allocation table (BAT) from the image file 34 as stored at the storage device 12 (step 607). As may be appreciated, at least some of the blocks referenced in the BAT have corresponding blocks referenced in the block layout from the SCP 16, and at least some blocks referenced in the BAT do not have corresponding blocks in such block layout. As should be understood, then, if a block referenced in the BAT does not have a corresponding block in the block layout, such block contains empty data, zeroed data, or null data or the like, and may be deleted from the image file 34.

Thus, the provider 32 receives the block layout from the SCP 16 and the BAT from the image file 34 (step 609), and compares such block layout from the SCP 16 with the BAT from the image file 34 (step 611). Note, though, that the block layout may not necessarily be in a similar format as the BAT of the corresponding image file 34, and also may not necessarily have exactly the same type of information as the BAT of such image file 34. Nevertheless, the provider 32 presumably can understand both the block layout and the BAT and can obtain appropriate information from both as necessary.

At any rate, upon comparing the block layout and the BAT, the provider 32 identifies the blocks referenced in the BAT that do not have corresponding blocks in the block layout as unnecessary blocks that may be deleted from the image file 34 (step 613), and creates a modified block layout for the image file 34 with the unnecessary blocks removed therefrom (step 615). As may be appreciated, the modified block layout of step 615 may take the form of a BAT or of a physical block layout of the image file 34. As may be appreciated, the BAT is similar to a physical block layout except that it holds file sector offsets inside the image file 34. Thereafter, the provider forwards a copy of the modified block layout to the maintenance application 20 at the SHP 14 (step 617), and the application 20 then compacts the image file 34 (step 619) by identifying data blocks within the image file 34 to be moved. Such compaction is generally known or should be apparent to the relevant public, and therefore need not be set forth herein in any detail.

Generally, in such compaction, data blocks are moved closer to the front of the image file 34 to free up space at the rear of such file 34, and also to de-fragment the blocks within the image file 34 (step 621) such that data that is logically contiguous is stored within data blocks that are physically contiguous. In the course of such compacting and de-fragmenting, and as may be appreciated, the application 20 sends commands to the provider 32 where each command specifies a source block that is occupied with data and a destination block that is empty, and the provider 32 accordingly moves the data within the specified source block to the specified destination block at the image file 34 and also appropriately updates the BAT at the image file 34. Notably, if a block at the end of the file 34 is removed, the file 34 is shrunk by the size of the removed block, thus resulting in compaction.

Merging Multiple Image Files 34

Figure 7:
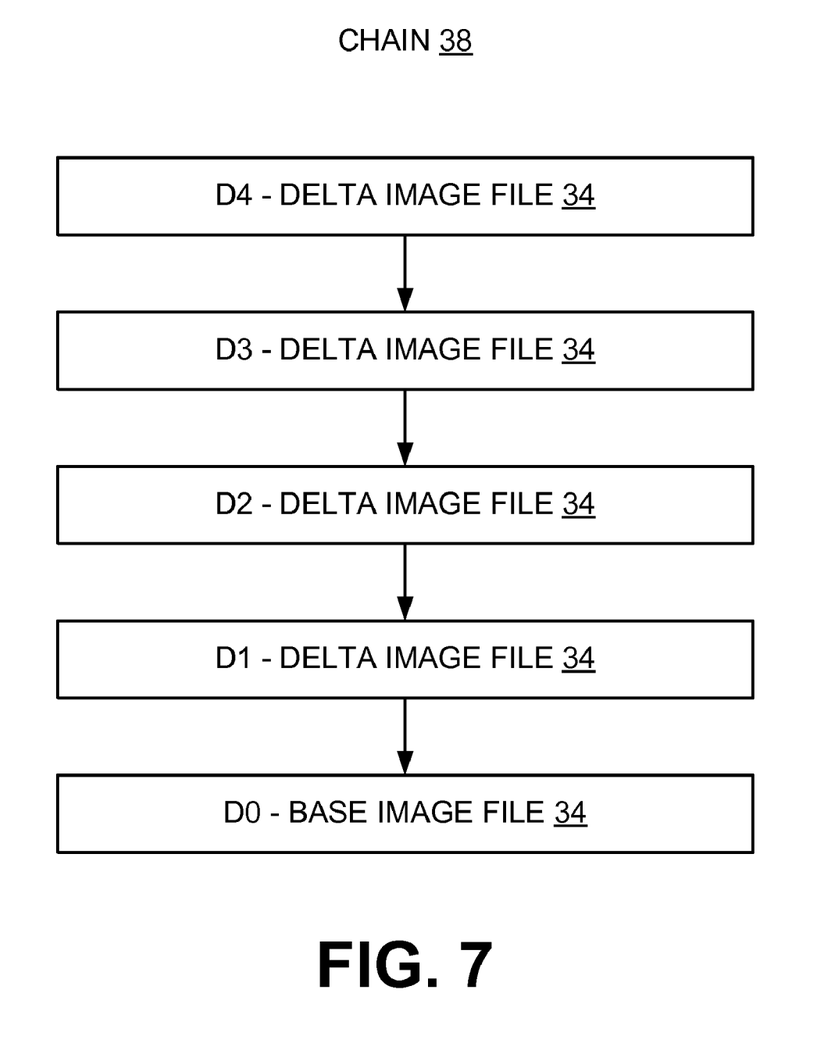
FIG. 7 is a block diagram showing a chain of image files such as the image file of FIG. 5, including a base image file at the bottom and a number of delta image files above.

As set forth above, a single image file 34 corresponds to a virtual storage device 12v of an SCP 16. However, and as may be appreciated, such virtual storage device 12v may instead be represented by a plurality of corresponding image files 34, where the plurality of image files 34 are organized as a chain 38, as is seen in FIG. 7, and where the chain 38 is in effect presented to the corresponding SCP 16 as a single image and a single virtual storage device 12v. As should be understood, employing a chain 38 of image files 34 is useful for certain scenarios, such as for example where a user might wish to employ one image file 34 as a base image file 34 and add another image file 34 as a delta image file 34 that represents changes made to the base image file 34. Thus, the base image file 34 is not altered by such changes and the user can un-do the changes if need be simply by deleting the delta image file 34 from the chain 38. Of course, a plurality of delta image files 34 may be cumulatively added to the chain 38 as and when desired.

Significantly, after the user has decided that the changes from a particular delta image file 34 are not to be un-done, such user can merge all the changes from the particular delta image file 34 into the parent image file 34 thereof in a manner that is generally known or should be apparent to the relevant public and therefore need not be set forth herein in any detail. However, current merging processes are limited in that such processes cannot be run on a chain 38 while the corresponding SCP 16 is running. In addition, such processes are limited in that if a chain has multiple delta image files 34, such multiple image files 34 cannot be merged in one pass but instead each delta image file 34 must be individually merged into the parent image file 34 thereof. Moreover, a user currently cannot add a new delta image file 34 to a chain 38 corresponding to a running SCP 16.

Accordingly, in one embodiment of the present invention, a method and mechanism is provided to perform merging on a chain 38 while the corresponding SCP 16 is running. In such embodiment, multiple image files 34 can be merged in one pass and a user can add a new delta image file 34 to a chain 38 corresponding to a running SCP 16.

Figure 8:
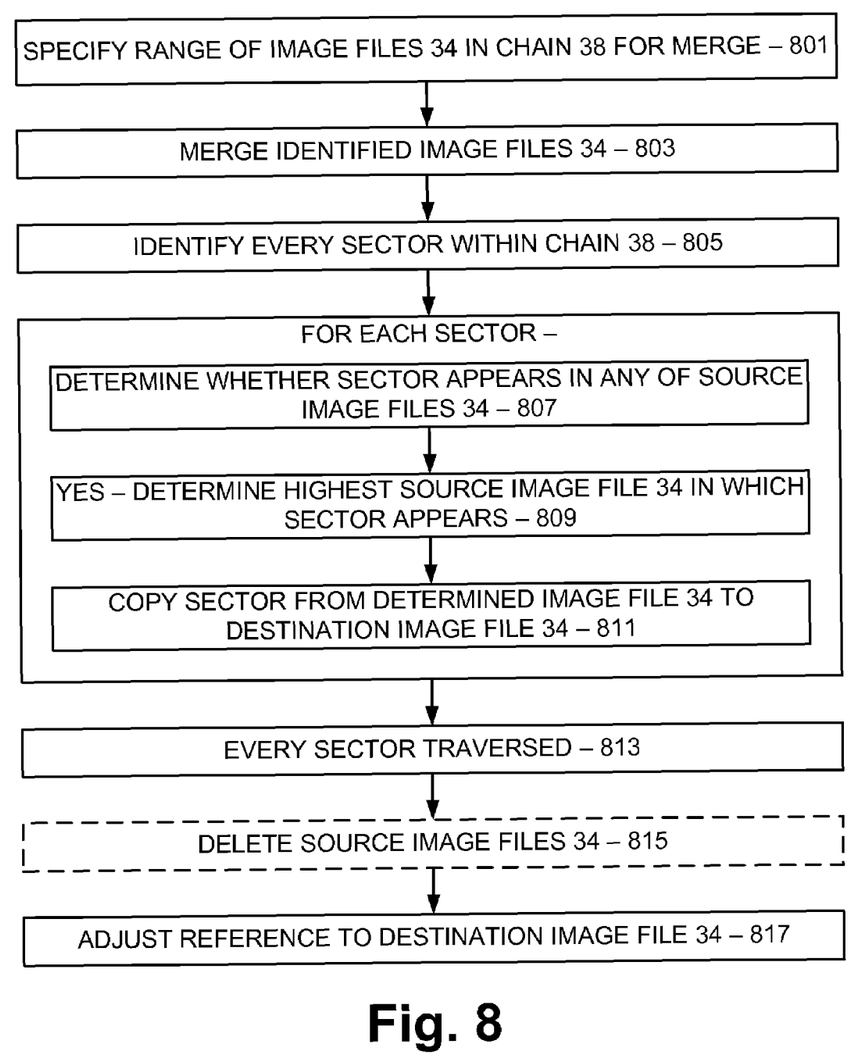
FIG. 8 is a flow diagram showing key steps performed by the SHP of FIGS. 3 and 4 when merging a number of the image files of the chain of FIG. 7 in accordance with one embodiment of the present invention.

Turning now to FIG. 8, it is seen that in one embodiment of the present invention, a chain 38 of image files 34 corresponds to the virtual storage device 12v of an SCP 16 and at least some of the delta image files 34 within the chain 38 are merged while the SCP 16 is running in the following manner. Preliminarily, a user initiates a merge operation by specifying a contiguous range of image files 34 within the chain 38 for the merge within the chain 38, including at least one source image file 34 and a destination image file 34, where the destination image file 34 is closest to the base image file 34 of the chain 38 (i.e., lowest) (step 801). For example, in one case where the chain 38 includes a base image file 34 as D0 and four delta image files 34 as D1-D4, D1 being the child of D0 and D4 having no child, the user may wish to merge D2-D4 into D1. Thereafter, the user issues a command to merge the identified image files 34 (step 803).

It should be appreciated at this point that each delta image file 34 is organized on a sector-by-sector basis or the like, and that each sector in a particular delta image file 34 represents a change to the corresponding sector as cumulatively represented within all image files 34 that precede the particular delta image file 34. Thus, and as an example, if a particular sector 7G appears in D4, D2, and D1 but not D0 or D3, the sector 7G in D1 adds such sector 7G to the chain 38 inasmuch as such sector 7G does not appear in D0, the sector 7G in D2 replaces the sector 7G in D1, the absence of sector 7G in D3 signifies that D3 does not replace such sector 7G in the chain 38, and the sector 7G in D4 replaces the sector 7G in D2.

In one embodiment of the present invention, then, and still referring to FIG. 8, every sector within the chain 38 is identified (step 805), and for each sector within the chain 38, the following procedure is performed. In particular, it is determined whether the sector appears in any of the source image files 34 in the chain 38 (step 807), and if so, the source image file 34 most distant from the base image file 34 (i.e., highest) and in which the sector appears is determined (step 809). Thereafter, the sector in such most distant source image file 34 is copied to the destination image file 34 (step 811). Note that if the sector already appears in the destination image file 34, the copying should be performed so as to replace such already-appearing sector.

Once every sector within the chain 38 is traversed in the manner of that which is set forth in connection with steps 807-811 (step 813), the source image files 34 may be deleted if desired (step 815), and any reference to the source image file 34 that was most distant from the base image file 34 (i.e., highest) within the chain 38, such as for example from the next delta image file 34 farther from such most distant source image file 34 within the chain 38 or from the virtual machine of the SCP 16, is adjusted to instead refer to the destination image file 34 (step 817).

Note that while the steps of FIG. 8 are being performed, it may in fact be the case that the SCP 16 corresponding to the chain 38 of image files 34 is in operation and performing file operations on the virtual storage device 12v thereof by way of the delta image file 34 at the high end of the chain 38 (i.e., most distant from the base image file 34 within the chain 38). However, it could be the case that the highest delta image file 34 is one of the source image files 38 for a merge. In such case, and in one embodiment of the present invention, a new delta image file 34 is created at the high end of the chain 38 so that the end of the chain 38 is now not a source image file 38 for the merge. Thereafter, and if desired, the new delta image file 34 at the high end of the chain 38 may also be merged in a similar manner to incorporate changes implemented during the (first) merge. Although such a new image file 34 requires a (second) merge, such second merge is not believed to be onerous, especially if the new delta image file 34 contains relatively few changes.

Note, too that rather than merging to a destination image file 34 at the low end of the selected range, it may instead be more efficient to merge to another delta image file 34 within the selected range. In particular, if the bulk of the changed sectors are in a particular delta image file 34, it may be more efficient to merge changes from above and from below into the particular delta image file 34. Note here, that merging to a destination image file 34 above a source image file 34 is performed in a manner similar to that which was set forth above except that the highest changed sector below the destination image file 34 is merged upward if no higher corresponding changed sector exists above such destination image file 34.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a method and mechanism is provided by which a storage image file 34 corresponding to a virtual storage device 12v may be stored on a storage hardware device 12 in a relatively compact form whereby null data from the virtual storage device 12v is only minimally represented within the storage image file 34. Maintenance may be performed on the storage image file 34, for example to compact same or to de-fragment same, or to merge a number of such image files 34 within a chain 38. Such maintenance can be performed while the virtual storage device 12v is being employed by a virtual machine or the like, such that the virtual machine need not be halted to perform the maintenance.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method with regard to a computing device partitioned to include a host partition (HP) instantiated at least in part to provide storage capabilities, and also to include a client partition (CP) instantiated at least in part to consume such storage capabilities of the HP in the form of a virtual storage device at the CP, the HP implementing the virtual storage device of the CP as an image file on a physical storage device, the method for the image file at the HP to be compacted while the CP is employing the corresponding virtual storage device and comprising:

receiving a command to compact the image file and determining that the CP is active and that the image file is currently in use by the CP to implement the virtual storage device thereof;

obtaining from the CP a block layout of the virtual storage device thereof, the block layout representing all allocated data blocks at the virtual storage device that have stored data and correspondingly non-allocated data blocks at the virtual storage device that have null data;

retrieving from the image file a block allocation table (BAT) thereof, the BAT representing the image file as stored as blocks at the physical storage device, at least some of the blocks referenced in the BAT having corresponding blocks referenced in the block layout from the CP, and at least some of the blocks referenced in the BAT not having corresponding blocks referenced in such block layout, whereby if a block is referenced in the BAT without a corresponding block in the block layout, such referenced block contains null data and may be deleted from the image file;

comparing the block layout from the CP and the BAT from the image file to identify each block referenced in the BAT that does not have a corresponding block in the block layout as an unnecessary block that may be deleted from the image file;

creating a modified block layout with each unnecessary block removed therefrom; and compacting the image by identifying from the modified block layout each data block to be removed from the image file and removing such identified data block.

2. The method of claim 1 wherein compacting the image file comprises moving data blocks closer to a front of the image file to free up space at an end of such image file.

3. The method of claim 1 wherein compacting the image file comprises de-fragmenting blocks within the image file such that data that is logically contiguous is stored within data blocks that are physically contiguous.

4. The method of claim 1 wherein compacting the image file comprises issuing a plurality of commands, each command specifying a source block that is occupied with data and a destination block that is empty, whereby the data within the specified source block is moved to the specified destination block at the image file and the BAT at the image file is correspondingly updated.

5. The method of claim 1 wherein compacting the image file comprises freeing up space at an end of such image file and shrinking the image file by a size corresponding to the freed up space.

6. The method of claim 1 wherein a maintenance application issues the command to compact the image file, the method comprising providing a copy of the modified block layout to the maintenance application and the maintenance application compacting the image file based on the modified block layout.

7. A computer-readable medium having stored thereon computer-executable instructions for implementing a method with regard to a computing device partitioned to include a host partition (HP) instantiated at least in part to provide storage capabilities, and also to include a client partition (CP) instantiated at least in part to consume such storage capabilities of the HP in the form of a virtual storage device at the CP, the HP implementing the virtual storage device of the CP as an image file on a physical storage device, the method for the image file at the HP to be compacted while the CP is employing the corresponding virtual storage device and comprising:

receiving a command to compact the image file and determining that the CP is active and that the image file is currently in use by the CP to implement the virtual storage device thereof;

obtaining from the CP a block layout of the virtual storage device thereof, the block layout representing all allocated data blocks at the virtual storage device that have stored data and correspondingly non-allocated data blocks at the virtual storage device that have null data;

retrieving from the image file a block allocation table (BAT) thereof, the BAT representing the image file as stored as blocks at the physical storage device, at least some of the blocks referenced in the BAT having corresponding blocks referenced in the block layout from the CP, and at least some of the blocks referenced in the BAT not having corresponding blocks referenced in such block layout, whereby if a block is referenced in the BAT without a corresponding block in the block layout, such referenced block contains null data and may be deleted from the image file;

comparing the block layout from the CP and the BAT from the image file to identify each block referenced in the BAT that does not have a corresponding block in the block layout as an unnecessary block that may be deleted from the image file;

creating a modified block layout with each unnecessary block removed therefrom; and compacting the image by identifying from the modified block layout each data block to be removed from the image file and removing such identified data block.

8. The medium of claim 7 wherein compacting the image file comprises moving data blocks closer to a front of the image file to free up space at an end of such image file.

9. The medium of claim 7 wherein compacting the image file comprises de-fragmenting blocks within the image file such that data that is logically contiguous is stored within data blocks that are physically contiguous.

10. The medium of claim 7 wherein compacting the image file comprises issuing a plurality of commands, each command specifying a source block that is occupied with data and a destination block that is empty, whereby the data within the specified source block is moved to the specified destination block at the image file and the BAT at the image file is correspondingly updated.

11. The medium of claim 7 wherein compacting the image file comprises freeing up space at an end of such image file and shrinking the image file by a size corresponding to the freed up space.

12. The medium of claim 7 wherein a maintenance application issues the command to compact the image file, the method comprising providing a copy of the modified block layout to the maintenance application and the maintenance application compacting the image file based on the modified block layout.

13. A method with regard to a computing device partitioned to include a host partition (HP) instantiated at least in part to provide storage capabilities, and also to include a client partition (CP) instantiated at least in part to consume such storage capabilities of the HP in the form of a virtual storage device at the CP, the HP implementing the virtual storage device of the CP as a plurality of image files on a physical storage device, the plurality of image files being organized as a chain including a base image file at a base of the chain and a delta image file at each level of the chain above the base, each delta image file representing changes to an intermediate image file cumulatively represented by the image files at the levels below such delta image file, each delta image file being organized on a sector-by-sector basis such that each sector in a particular delta image file represents a change to a corresponding sector of the intermediate image file below, the method for merging at least a part of the chain of image files into a single image file while the CP is employing the corresponding virtual storage device and comprising:

receiving a command to merge a range of the chain of image files and determining that the CP is active and that the chain of image files is currently in use by the CP to implement the virtual storage device thereof, the range including at least one source image file and a destination image file, where the destination image file is closest to the base image file of the chain;

identifying every sector specified within the range of the chain, and operating on each identified sector by:

determining whether the identified sector appears in any of the source image files of the range, and if so, determining the source image file most distant from the base image file in which the identified sector appears; and copying the identified sector in such most distant source image file to the destination image file;

whereby after every identified sector is operated on, the destination image file represents the merged range of the chain of image files.

14. The method of claim 13 further comprising after every identified sector is operated on to produce the merged range of the chain of image files, deleting the source image files and adjusting any reference to the source image file that was most distant from the base image file to instead refer to the destination image file.

15. The method of claim 13 further comprising after every identified sector is operated on to produce the merged range of the chain of image files, adjusting any reference to the source image file that was most distant from the base image file to instead refer to the destination image file.

16. The method of claim 13 wherein while every identified sector is operated on to produce the merged range of the chain of image files, the CP performs file operations on the virtual storage device thereof by way of the delta image file at the end of the chain opposite the base image file, such end delta image file being outside the range of the merge command.

17. The method of claim 13 wherein the CP is performing file operations on the virtual storage device thereof by way of the delta image file at the end of the chain opposite the base image file and such end delta image file is inside the range of the merge command, the method further comprising, prior to operating on every identified sector, creating a new delta image file at the end of the chain opposite the base image file, the created image file being outside the range of the merge command, and transferring performing of file operations on the virtual storage device thereof to the created image file.

18. The method of claim 13 wherein copying the identified sector in the most distant source image file to the destination image file replaces the corresponding sector in the destination image file if such sector already appears in the destination image file.

19. The method of claim 13 comprising receiving a command to merge a contiguous range of the chain of image files.

* * * * *